United States Patent
Masterjoseph

[11] 3,864,261
[45] Feb. 4, 1975

[54] AQUARIUM SEDIMENT TRAP

[75] Inventor: Liebert J. Masterjoseph, Yonkers, N.Y.

[73] Assignee: The Raymond Lee Organization, Inc., New York, N.Y.

[22] Filed: Jan. 14, 1974

[21] Appl. No.: 433,078

[52] U.S. Cl.................. 210/163, 210/169, 210/477
[51] Int. Cl............................................ B01d 35/02
[58] Field of Search .......... 210/163, 164, 165, 166, 210/169, 172, 262, 455, 460, 477; 55/466; 209/255, 490, 494

[56] References Cited
UNITED STATES PATENTS

| | | | |
|---|---|---|---|
| 616,336 | 12/1898 | Kersten | 210/172 |
| 2,636,473 | 4/1953 | Schnaltz et al. | 210/169 X |
| 2,770,362 | 11/1956 | Paquin | 210/172 X |
| 2,871,820 | 2/1959 | Hayden | 210/169 U X |
| 3,119,774 | 1/1964 | Arak | 210/169 |
| 3,211,291 | 10/1965 | Teutsch | 210/172 |
| 3,247,826 | 4/1966 | Girard | 210/169 X |
| 3,666,104 | 5/1972 | Aprill, Jr. et al. | 210/164 |

Primary Examiner—Theodore A. Granger

[57] ABSTRACT

An aquarium has a suction pipe running along the inside bottom surface. A hollow container having an open bottom with vertical closed sides, one of which has an opening, is disposed in the tank and extends upward from the bottom surface. The container has a top surface extending inward and downward from the walls to a central drain hole. The suction end of the pipe is connected to the bottom of the hole. A hollow cover enclosing the top container surface is secured thereto. The cover has small openings through which water can be drawn from the tank into the pipe.

1 Claim, 2 Drawing Figures

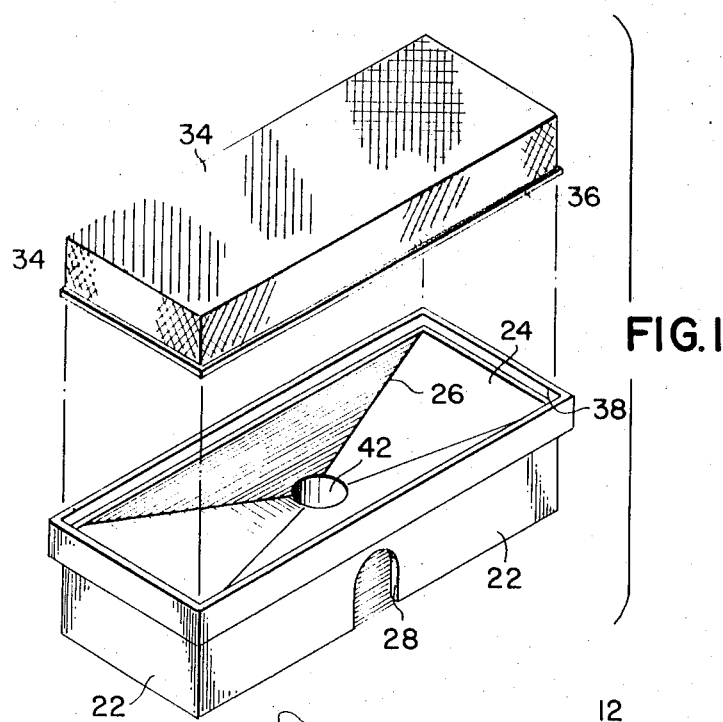
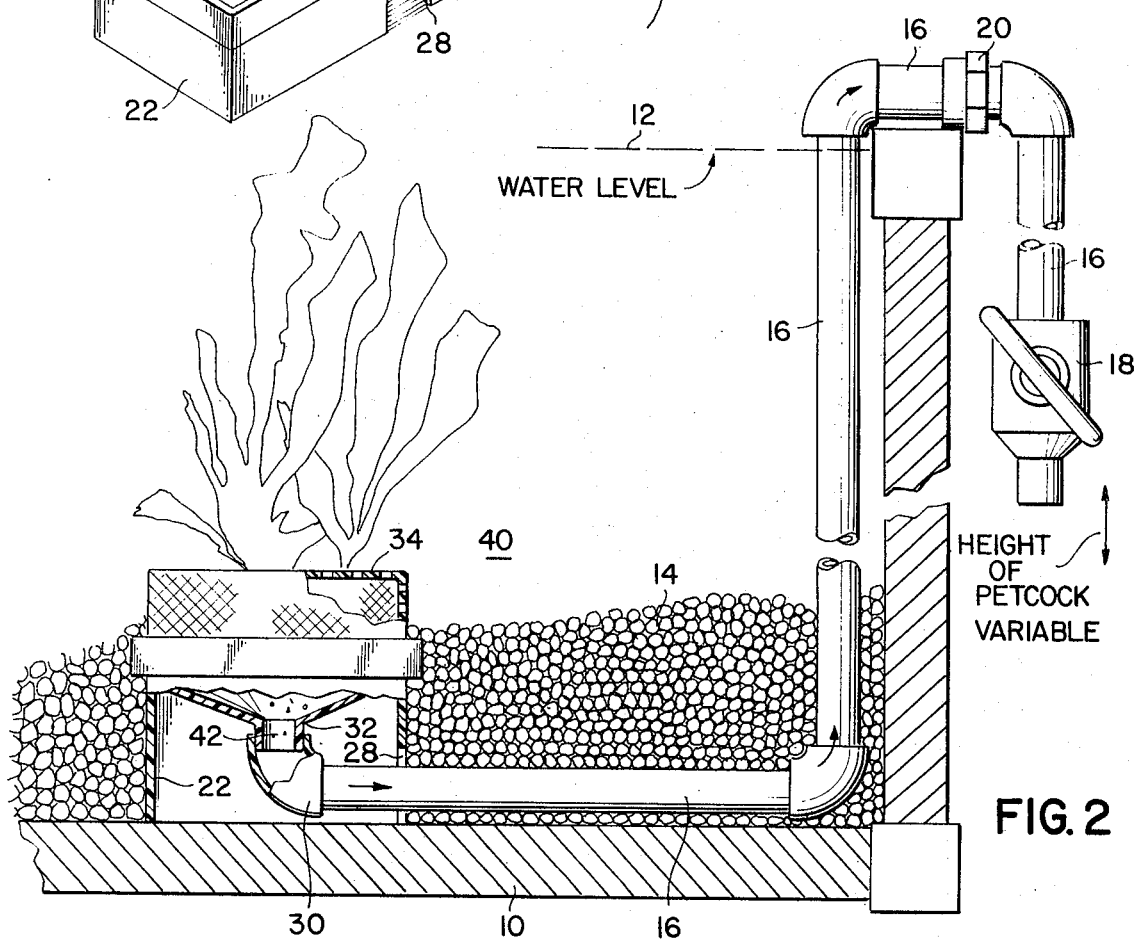
FIG. 1
FIG. 2

AQUARIUM SEDIMENT TRAP

SUMMARY OF THE INVENTION

One of the biggest problems in raising or breeding tropical fish is keeping the aquarium clean.

The natural circulation of the water using the normal filtering systems and the movement of the fish themselves tend to make the droppings and uneaten food eventually settle to the lowest point of the tank or in depressions in the gravel.

Though the normal filtering systems do remove some of this sediment while circulating the water it is not adequate.

The fish in their normal daily endeavors disturb this sediment again making the water cloudy and unsightly. This sediment again will eventually re-settle.

Hence there is a need to keep this sediment from being disturbed, and then to be able to siphon the sediment from the tank.

In this invention, a hollow container open at the bottom and having closed vertical sides rests at the bottom of the fish tank. The top surface of the container slopes inward and downward to a central drain hole.

A suction pipe extends along the bottom of the tank through a hole in one of the sides of the container is secured to the bottom of the drain hole.

A hollow cover enclosing the top container surface is secured thereto. The cover has small openings through which the water can pass, the sediment passing through the small openings and accumulating on the top surface of the container. The sediment flows downward to the drain hole and is removed from the tank by suction.

A square is constructed comprising four sides and a top surface made of ordinary plastic window screen. This square is placed (top up) on the bottom of the tank preferably at the tank's lowest point. Through the action of the water in the aquarium the sediment passes through the tiny openings of the screen and is trapped. By adding a plastic bottom that will funnel the sediment to a siphon hose (see FIGS. 1 and 2) the sediment is removed from the tank. The screen square can be removed for periodical cleaning.

The dimensions or shape can vary, square, round, rectangular, etc. The rectangular shape is particularly useful because most aquariums are rectangular and the trap is less conspicuous. To elaborate on the basic idea one can adapt to the screen top such plastic objects as fan type sea coral, aquotic plants, a sunken galleon etc. Such objects not only make the trap more attractive but also help guide floating particles to the trap. A perforated star fish is also a good design to serve this purpose.

BRIEF DESCRIPTION OF THE DRAWINGS

In the drawings:

FIG. 1 is an exploded view of certain parts used in the invention; and

FIG. 2 is a side view in cross section showing the invention in use.

DETAILED DESCRIPTION OF PREFERRED EMBODIMENT

Referring now to FIGS. 1-2, an aquarium or fish tank 10 is filled with water up to level 12. The bottom of the tank contains gravel 14. A suction pipe 16 extends along the bottom of the tank and then rises vertically out of the tank, extends horizontally over the top edge and then drops downward to a petcock 18. The horizontal section can be connected to the outside vertical section by swivel type union 20.

The structure thus far described employs piping which can be used as a siphon to cause water to empty out of the petcock into a suitable container. To this end the petcock must be disposed below the water level.

The swivel union enables the user to move the external piping from a vertical position to the horizontal position when not in use. This is a safety feature; if the petcock should fail, the water in the piping will run back into the tank.

A pump can also be used in conjunction with an external sediment trap to clean the water and recirculate the cleaned water back into the tank.

A hollow container open at the bottom has vertical closed sides 22 and a top surface 24 which extends downwardly and inwardly to a central drain hole 42. The surface 24 is rectangular in shape and has an X shaped diagonally disposed gutter 26 centered on the hole.

The container rests on the bottom of the tank with a side opening 28 through which the pipe passes, the free end of the pipe being disposed under the hole and is connected thereto by an elbow 30 to a sleeve 32 forming the drain hole.

A cover 40 made of fine mesh screening 34 encloses the container. More particularly, the cover is open at the bottom with an outwardly extending horizontal bottom lip 36. The container has a raised outer periphery 38, the lip snap fitting within and being in engagement with the periphery 38.

The invention can then be used as described above.

While I have described my invention with particular reference to the drawings, such is not to be considered as limiting its actual scope.

Having thus described this invention, what is asserted as new is:

1. In combination with an aquarium tank having a suction pipe running along the inside bottom surface, a sediment trap comprising:
  a vertical hollow rectangular member open at top and bottom and resting on said inside bottom surface, said member having a side opening in one wall, said pipe extending through said opening with a suction end disposed in the member, said member having a raised vertical periphery surrounding the top thereof;
  a container removably disposed in the open top of the member, said container having a surface which extends downwardly and inwardly to a central drain hole, said surface being rectangularly shaped with an X-shaped diagonally disposed gutter centered on said hole;
  means securing the suction end of said pipe to the bottom of said drain hole; and
  a hollow cover enclosing said container surface and having small openings through which water can be drawn from the tank into the pipe, said cover having a bottom periphery with an outwardly extending lip which is inserted with snap fit into the raised member periphery for engagement therewith.

* * * * *